(No Model.) 2 Sheets—Sheet 1.
C. F. PIKE.
SEALING DEVICE FOR THE OPERATING MECHANISM OF WATER CLOSETS.
No. 270,112. Patented Jan. 2, 1883.
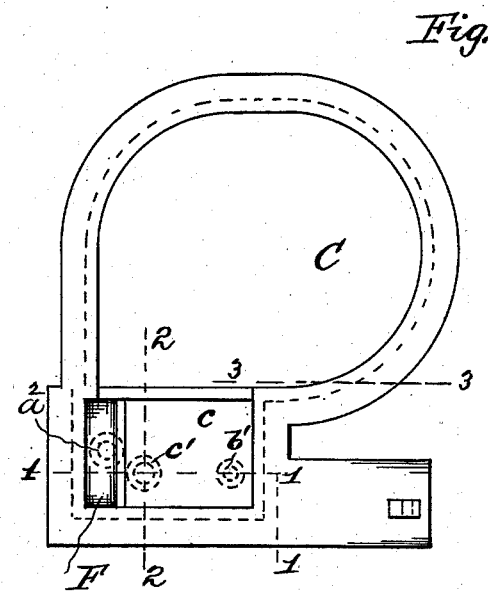
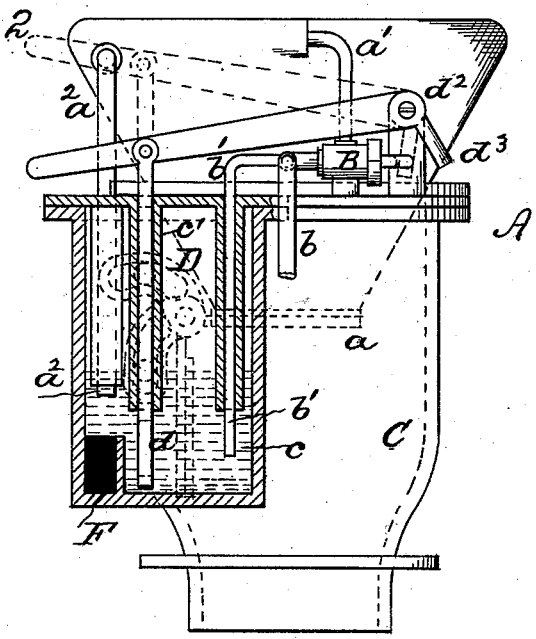
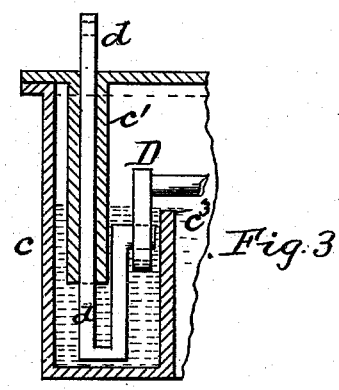
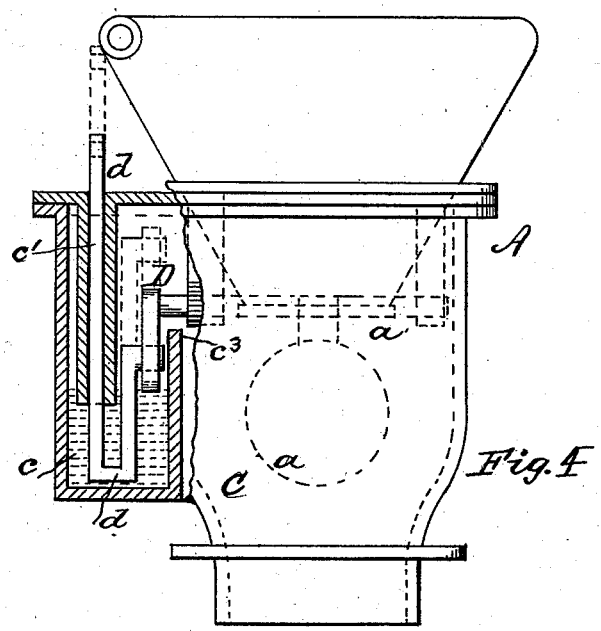
Witnesses:
W. H. Van Horn
Charles H. Miller
Inventor,
Charles F. Pike
By S. J. Vanstavoren
Attorney.

(No Model.) 2 Sheets—Sheet 2.
C. F. PIKE.
SEALING DEVICE FOR THE OPERATING MECHANISM OF WATER CLOSETS.
No. 270,112. Patented Jan. 2, 1883.
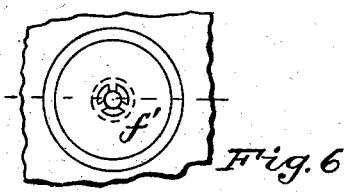
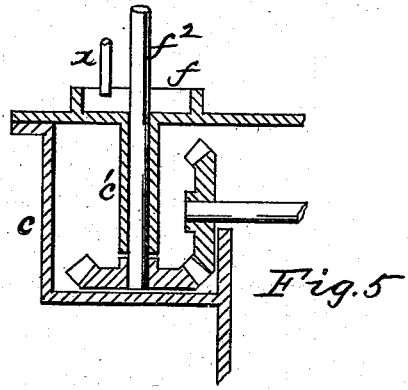
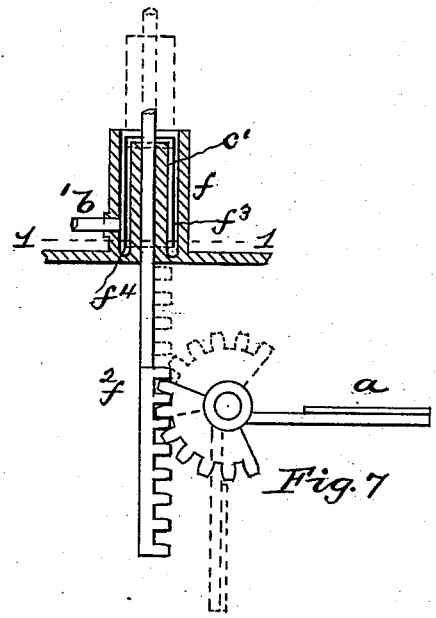
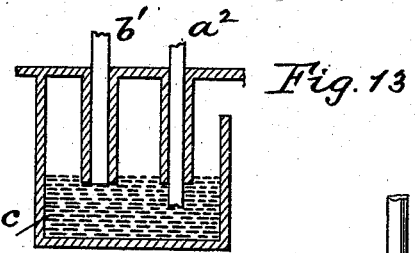
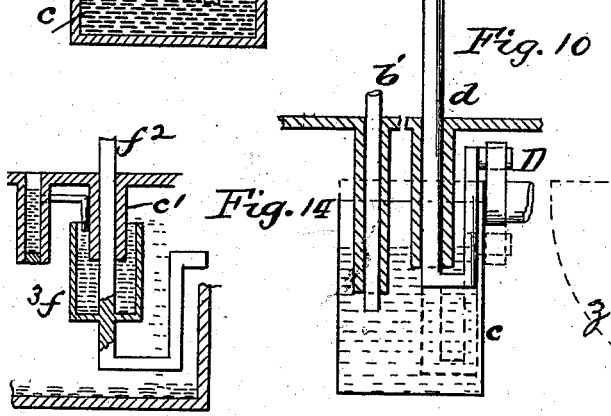
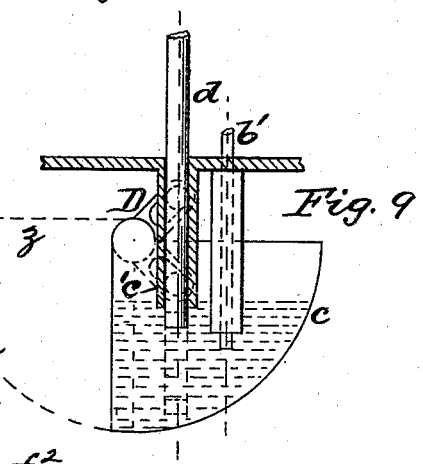
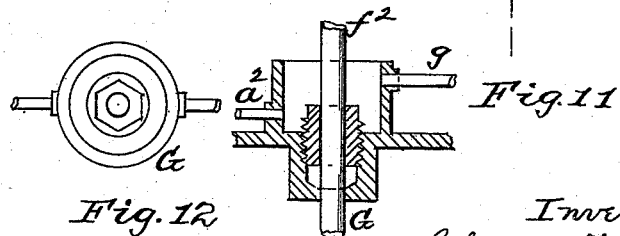
Witnesses:
W. H. Van Horn
Charles H. Miller.
Inventor,
Charles F. Pike
By S. J. Vanstavoren
Attorney.
N. PETERS, Photo-Lithographer, Washington, D. C.

UNITED STATES PATENT OFFICE.

CHARLES F. PIKE, OF PHILADELPHIA, PENNSYLVANIA, ASSIGNOR TO THE NATIONAL ANTI-SEWER GAS COMPANY, OF CAMDEN, NEW JERSEY.

SEALING DEVICE FOR THE OPERATING MECHANISM OF WATER-CLOSETS.

SPECIFICATION forming part of Letters Patent No. 270,112, dated January 2, 1883.

Application filed July 27, 1882. (No model.)

*To all whom it may concern:*

Be it known that I, CHARLES F. PIKE, a citizen of the United States, residing at Philadelphia, in the county of Philadelphia and State of Pennsylvania, have invented certain new and useful Improvements in Sealing Devices for the Operating Mechanism of Water-Closets, of which the following is a specification, reference being had therein to the accompanying drawings, wherein—

Figure 1 is a plan of a receiver or container for a water-closet bowl adapted and designed to be used in the practical application of my invention. Fig. 2 is a section of same on line 1 1, Fig. 1, the bowl, the operating mechanism for the pan or clapper, and the water-pipes being shown in elevation. Fig. 3 is a broken detail section on line 2 2, Fig. 1. Fig. 4 is a side elevation of Fig. 2, partly sectional on line 2 2 and broken away on line 3 3, Fig. 1. Fig. 5 is a detail section of gear-operating mechanism designed to be sealed in accordance with my invention. Fig. 6 is plan of the cap or cover therefor. Fig. 7 shows the application of my invention to rack-and-gear mechanism for pan or clapper. Fig. 8 is a section on line 1 1, Fig. 7. Fig. 9 is an elevation, partly sectional, showing a modification of mechanism for operating the pan or clapper and the seal therefor. Fig. 10 is a transverse section of Fig. 9. Fig. 11 is a like view of still another modification. Fig. 12 is a plan of the same. Fig. 13 is a section showing a modification of my invention, and Fig. 14 is a section showing a modification of devices shown in Fig. 7.

My invention has relation to water-closets, and has special reference to the provision of a seal for the mechanism operating the pan or clapper, such seal being located at that part of the receiver or container through which said mechanism passes, whereby the receiver or container is made perfectly air-tight to prevent the sewer-gas passing therethrough or escaping therefrom. In an application for patent for water-closets filed by me on the 12th day of April, 1882, I show and describe a running-water seal for such mechanism and the water-closet bowl; but in the specification I have stated that so much of the same as relates to the water valve and pipe for effecting such seal I intend making the subject of a future application. In preparing such last-named application I found it necessary to divide the same in two divisions—one for the running-water seal for the bowl, which was made the subject of an application filed the 5th day of October, 1881, and the other for a seal, either running or otherwise, for the mechanism operating the pan or clapper of the bowl. The present application embraces the second division above numerated. Accordingly my invention embraces a water-closet having a pan or clapper-valve and mechanism for operating the same, which is designed and adapted to be sealed in mercury, running water, or other suitable fluid substance. Any form of bowl having pan or clapper may be used, and any desired construction of operating mechanism therefor may be employed.

To illustrate the practical application of my invention, I will proceed to describe some of the many forms of such mechanism and the manner of sealing the same.

Referring to Figs. 1 to 4, inclusive, of the accompanying drawings, A represents a water-closet having clapper-valve or pan $a$, flushing-pipe $a'$, and overflow-pipe $a^2$.

B represents the water-cock, $b$ the supply-pipe therefor, and $b'$ is a branch entering a chamber, $c$, in the retainer C, to which also passes the overflow-pipe $a^2$, as shown.

D represents a slotted crank secured to clapper $a$, which connects by means of a link, $d$, to lever $d'$, pivoted at $d^2$, and provided with a tail-piece, $d^3$, which opens and allows valve B to close when lever $d'$ is suitably moved.

It will be noticed that the long arm of link $d$ rests and moves in a tube or flange, $c'$, depending from the receiver lid or cap, as do also the branch pipe $b'$ and overflow-pipe $a^2$. Hence when the water in the bowl A overflows into pipe $a^2$ such water passes into chamber $c$, and rises therein until it overflows over the edge $c^3$ of said chamber, as shown in Fig. 3. The ends of the depending tubes are therefore immersed in such water, as shown in Figs. 1 and 2, and a fluid seal is formed for the link $d$, or that part of the operating mechanism for the pan or clapper which passes through the receiver or container, thereby making the latter air-tight; consequently no sewer-gas can escape therefrom to pollute the air of the apartment wherein such closet is located.

If it is desired to provide a running-water seal for the chamber c, the branch pipe b' is provided, as above described, so that from it a small stream of water is constantly passing into the chamber c in the intervals between the flushing of the bowl.

Where the bowl or closet is frequently used the branch pipe b' may, if desired, be dispensed with, as the overflow from the numerous flushings of the bowl will keep the water in the chamber c more or less sweet or pure, to absorb any sewer-gas or fecal-matter odor that may pass into or be generated in the container.

If desired, a pocket, F, may be formed in chamber c, in which is designed to be placed a cake of disinfecting material or a disinfectant in a fluid or other suitable form. The water or sealing-fluid in chamber c becomes impregnated with such disinfectant, and becomes a disinfecting-seal to further insure the prevention of sewer-gas or other deleterious odors escaping from the receiver or container.

In Fig. 5 I have shown the seal applied to gear mechanism for operating the pan or clapper, wherein the top of the receiver is provided with a dish or receptacle, $f$, communicating by means of openings $f'$, Fig. 6, through said top and depending tube $c'$, with chamber $c$. The shaft $f^2$ passes through said tube. The end of branch pipe $b'$ or overflow-pipe $a^2$ is represented at $x$ emptying into dish $f$. The water from said pipe flows into said dish or receptacle, thence through openings $f'$ into chamber $c$ to seal the tube $c'$ and shaft $f^2$, as before described. In Fig. 7 the shaft $f^2$ is provided with a rack gearing with a segmental pinion secured to the shaft of the clapper $a$. The dish or receptacle $f$ in this figure is provided with an upwardly-projecting tube, $c'$, having openings or slots $f'$, and on the shaft $f^2$ is secured a cap or cup, $f^3$, surrounding said tube $c'$. The water from the branch $b'$ or overflow-pipe $a^2$ enters dish $f$, passes down under the edge $f^4$ of cap $f^3$, and rises therein until it overflows through openings $f'$, Fig. 8, into the receiver or container. The use of the latter construction permits of the chamber $c$ being dispensed with. In Figs. 9 and 10 the chamber $c$ is not formed integral with the receiver or container, but is a separate vessel secured to the clapper-shaft, and is designed to be tilted when the clapper is correspondingly moved, as indicated by dotted lines $z$ $z$ in said figures. In Figs. 11 and 12 the shaft $f^2$ is represented as passing through a stuffing-box, G. The water from overflow-pipe $a^2$ or branch $b'$ enters the dish or receptacle $f$ until it rises above the stuffing-box, as shown, to seal the same. $g$ represents an overflow-pipe from dish $f$, and is designed to pass to the container, trap, or bowl, as desired.

I have stated that the above-described seal may be a water-seal; but in lieu thereof a mercury-seal may be employed, as shown in Fig. 13, wherein such material is placed in the chamber $c$ to seal the mechanism therein, and when so employed the branch $b'$ and pipe $a^2$ may be dispensed with, or, if desired, they may be used, in which case the hydrostatic pressure in such pipes will at intervals displace the mercury to permit the passage of water through said pipes into chamber $c$, and thence to the container.

In Fig. 14 I have shown a modification of the cap mechanism $f^3$ shown in Fig. 7, wherein said cap is inverted and surrounds the depending tube $c'$, the result in either case being the same—to wit, the sealing of rod or shaft $f^2$. The shaft $f^2$ corresponds to the link $d$ in Figs. 1 to 4, as by raising, lowering, or rotating either a movement of the clapper or pan is effected.

What I claim as my invention is—

1. A water-closet bowl and receiver or container provided with a pan or clapper, and mechanism for operating the same, which is sealed by a fluid seal, substantially as shown and described.

2. In a water-closet, the combination of the following elements—viz., a bowl, a receiver or container, a pan or clapper for said bowl, operating mechanism therefor, and a water-supply pipe having branch leading into a receptacle or chamber to form a seal for said operating mechanism, substantially as shown and described.

In testimony whereof I affix my signature in presence of two witnesses.

CHARLES F. PIKE.

Witnesses:
 CHAS. F. VAN HORN,
 S. J. VAN STAVOREN.